(12) United States Patent
Iyoki et al.

(10) Patent No.: US 8,813,261 B2
(45) Date of Patent: Aug. 19, 2014

(54) SCANNING PROBE MICROSCOPE

(71) Applicant: Hitachi High-Tech Science Corporation, Tokyo (JP)

(72) Inventors: Masato Iyoki, Minato-ku (JP);
Naokatsu Nosaka, Minato-ku (JP);
Hiroumi Momota, Minato-ku (JP);
Junji Kuwahara, Minato-ku (JP)

(73) Assignee: Hitachi High-Tech Science Corporation, Minato-ku, Tokyo (JP)

( * ) Notice: Subject to any disclaimer, the term of this patent is extended or adjusted under 35 U.S.C. 154(b) by 0 days.

(21) Appl. No.: 13/974,634

(22) Filed: Aug. 23, 2013

(65) Prior Publication Data

US 2014/0059724 A1    Feb. 27, 2014

(30) Foreign Application Priority Data

Aug. 24, 2012 (JP) ................................. 2012-185477

(51) Int. Cl.
*G01Q 30/18*    (2010.01)
*G01Q 10/00*    (2010.01)
*G01Q 30/02*    (2010.01)
*B82Y 35/00*    (2011.01)

(52) U.S. Cl.
CPC ................ *G01Q 10/00* (2013.01); *G01Q 30/18* (2013.01); *G01Q 30/025* (2013.01); *B82Y 35/00* (2013.01)
USPC ................... 850/6; 850/33; 73/105

(58) Field of Classification Search
USPC ................... 850/6, 9, 10, 33; 73/105
See application file for complete search history.

(56) References Cited

U.S. PATENT DOCUMENTS

| | | | | |
|---|---|---|---|---|
| 5,859,364 A | * | 1/1999 | Toda et al. | 73/105 |
| 6,469,288 B1 | * | 10/2002 | Sasaki et al. | 250/201.3 |
| 7,333,191 B2 | * | 2/2008 | Murayama et al. | 356/150 |

FOREIGN PATENT DOCUMENTS

| | | |
|---|---|---|
| JP | 2006-023443 A | 1/2006 |
| JP | 2006-090715 A | 4/2006 |

* cited by examiner

*Primary Examiner* — Kiet T Nguyen
(74) *Attorney, Agent, or Firm* — Banner & Witcoff, Ltd.

(57) ABSTRACT

A scanning probe microscope including: a scanning probe microscope unit section including, a cantilever having a probe, a cantilever holder configured to fix the cantilever, a sample holder on which a sample is configured to be placed, a horizontal fine transfer mechanism configured to relatively scan a surface of the sample with the probe, a vertical fine transfer mechanism configured to control a distance between the probe and the sample surface, an optical microscope configured to observe the cantilever and the sample; a control device; an imaging device to which a viewing field, wider than that of the optical microscope and capable of observing the cantilever and the sample at the same time, can be set; and an image display device configured to display images observed by the optical microscope and the imaging device.

20 Claims, 7 Drawing Sheets

SCANNING PROBE MICROSCOPE

CROSS-REFERENCE TO RELATED APPLICATIONS

This application claims priority from Japanese Patent Application No. 2012-185477 filed on Aug. 24, 2012, the entire contents of which are incorporated herein by reference.

TECHNICAL FIELD

Aspects of the present invention relate to a scanning probe microscope that scans a sample surface with a probe to perform a shape observation and a physical property measurement of the sample surface.

BACKGROUND

In a related art scanning probe microscope, a probe and a sample are brought into contact with each other with the use of a cantilever having the probe to detect an amount of deflection of the cantilever, and an amount of amplitude when the cantilever vibrates by a displacement detection mechanism using, for example, an optical lever system (a semiconductor laser is condensed on a cantilever back surface, and a change of a reflected light from the cantilever is detected by the amount of movement on a photodetector). As a result, the probe and the sample surface are relatively scanned by a horizontal fine transfer mechanism while controlling a distance between the probe and the sample surface by a vertical direction fine movement mechanism according to the attenuation of the amount of deflection or the amplitude, or an amount of variation in a phase or a resonance frequency. As a result, the shape and the physical property of the sample surface are measured.

In the measurement of the scanning probe microscope, for the purposes of 1) positioning a spot of a semiconductor laser on the cantilever when using the optical lever system, and 2) positioning a probe tip on a portion to be measured of the sample, there is frequently provided an optical microscope that can observe at the same time the cantilever and the laser spot of the optical lever system, and the cantilever and the sample surface.

In the related art scanning probe microscope, a length of the cantilever is about 50 μm to 500 μm, a scanning area normally has one side of 100 μm or smaller, and one side of 1 mm or smaller even in a specific application. For this reason, in order to achieve the above objects 1) and 2), a viewing field size of the optical microscope is normally set to an area having one side of about 100 μm to 2000 μm. The sample is locally observed by an objective lens having an optical axial orientation aligned to a substantially perpendicular direction to the sample surface immediately above or on a lower side of the sample surface. An observation image of the objective lens is focused on an image sensor such as a CCD or a CMOS, and is displayed on a display.

In the scanning probe microscope, a control device is provided separately from a unit, and an equipment such as a keyboard, a mouse, a joy stick, or a trackball is operated to perform a measurement while watching the display connected to the control device.

The size of the viewing field can be varied within the above-mentioned range through a technique such as replacement of an objective lens by a revolver, an optical zoom mechanism, or a digital zoom that enlarges an image on the display.

The observation of the sample surface is performed from a direction substantially perpendicular to the sample by bending the optical axis through a mirror, even when the optical axis of the objective lens is arranged obliquely to the sample surface due to the layout of the device.

In the optical laser spot adjustment, a two-axial transfer mechanism that can transfer the spot in a longitudinal direction and a width direction of the cantilever is provided. Also, in order to position the sample and the probe, there is provided a coarse transfer mechanism that relatively transfers the sample and the probe in a horizontal direction (X- and Y-directions) and a perpendicular direction (Z-direction) to the sample surface.

An optical microscope that observes between the probe tip and the sample surface may be used in combination with the optical microscope having the optical axis perpendicular to the sample surface for the following purposes. For example, the optical microscopes are used in combination when the probe and the sample are brought closer to each other by the coarse transfer mechanism in the Z-direction, so as to confirm a distance between the probe and the sample to prevent a collision between the probe and the sample while bringing the probe and the sample closer to each other at a high speed. Further, the optical microscopes are used in combination to observe a near-field spot on the sample surface being scattered by the probe tip of a scanning near-field microscope, which is one type of the scanning probe microscope. In this case, in order to observe the probe tip, the optical axis of the optical microscope is set at a shallow angle to the sample surface. The optical axis is set at the angle smaller than an angle formed between an edge of a side surface of the cantilever and the probe tip, as a result of which the probe tip can be observed without being shadowed by the cantilever.

[Patent Literature 1] JP-A-2006-23443
[Patent Literature 2] JP-A-2006-90715

An overall size of the sample observed by the scanning probe microscope is frequently 10 mm or more in diameter in commercial devices. Also, in a semiconductor field which is one of the typical applied fields of the scanning probe microscope, there are many cases in which an arbitrary place of the sample 2 to 12 inches in diameter is measured. Further, in recent years, large-sized liquid crystal panels are observed. Thus, for the large-sized samples, the viewing field is too narrow in the optical microscope for sample observation mounted in the related art scanning probe microscope, and which portion of the overall sample is being measured cannot be grasped on the display. For that reason, in related-art, a measurer moves in front of the unit and operates the respective coarse transfer mechanisms in the horizontal (XY) direction and the vertical (Z) direction by a joystick while visually confirming the sample and the cantilever on the unit to perform coarse positioning, until a portion to be measured of the sample and the cantilever can be seen in the viewing field of the microscope. Thereafter, the measurer performs local observation through the optical microscope image on the display to position the spot of the optical lever on the cantilever or to precisely position the probe and the portion to be measured of the sample.

Also, in the microscope for confirming a distance between the probe and the sample in a height direction, because observation is performed at the shallow angle to the sample surface, the positions of the probe and the sample in-plane cannot be grasped.

Further, because the scanning probe microscope brings the probe and the sample into contact with each other or closer to each other to perform the measurement, a disturbance such as vibration, sound, or wind can become a noise component of the measurement data. Also, when a displacement detection mechanism of the optical lever system is used, a light may become a noise source. For that reason, the unit needs to be placed on a vibration isolation table, and housed in a soundproof cover formed of a metal plate or a sound proof material, a windproof cover having a periphery surrounded by an arbitrary material, or a lightproof cover that shields a light to perform the measurement. When the unit is housed in the soundproof cover, the windproof cover, or the lightproof cover, the sample and the cantilever cannot be visually recognized from the external. Therefore, the measurer needs to move in front of the unit every time an observation place is changed, retreat the probe and the sample from each other by several hundred μm or more for the purpose of preventing the probe and the sample from being damaged by vibration, open the cover to position a measurement place while confirming the cantilever and the sample, again close the cover, precisely position the portion to be measured by the optical microscope, and bring the probe and the sample closer to each other to perform the measurement. In this case, it takes a very long time to start the measurement. The measurer needs to move his body from a front of the display, and needs to perform a very cumbersome work.

For example, it is conceivable that a part of the cover is formed of a glass window enabling visual observation. However, this configuration is not preferable because a soundproof performance of the glass portion is also degraded, and the costs are also increased. Also, the visibility in a part of the cover is lower than that when the overall cover is opened.

Further, in the scanning probe microscope, the measurement may be performed in a vacuum or a gas atmosphere. In this case, because a circumference of the unit is covered with a chamber or a globe box, an interior situation of the unit is hardly confirmed from the external. Therefore, there is a need to open the chamber or the globe box to open the atmosphere for each confirmation.

SUMMARY

The present invention has been made to solve the above problem, and therefore aims at providing a scanning probe microscope that can efficiently and easily confirm a position of the cantilever relative to an entire sample while watching a screen of the display without moving in front of the unit, and perform positioning with a high precision.

In order to solve the above problem, the present invention provides a scanning probe microscope described below.

According to an aspect of the present invention, there is provided a scanning probe microscope including: a scanning probe microscope unit section including, a cantilever having a probe at a tip thereof, a cantilever holder configured to fix the cantilever, a sample holder on which a sample is configured to be placed, a horizontal fine transfer mechanism configured to relatively scan a surface of the sample with the probe, a vertical fine transfer mechanism configured to control a distance between the probe and the sample surface, a horizontal coarse transfer mechanism and a vertical coarse transfer mechanism which are larger in operation range than the horizontal fine transfer mechanism and the vertical fine transfer mechanism, and an optical microscope configured to observe the cantilever and the sample; a control device configured to control the scanning probe microscope; an imaging device having an observation axis non-coaxial with an optical axis of the optical microscope, and to which a viewing field, which is wider than that of the optical microscope and capable of observing the cantilever and the sample at the same time, can be set; and an image display device including a first image display configured to display an image observed by the optical microscope and a second image display configured to display an image observed by the imaging device.

DETAILED DESCRIPTION

Hereinafter, embodiments of the present invention will be described with reference to the accompanying drawings.

First Embodiment

Figure 1A:
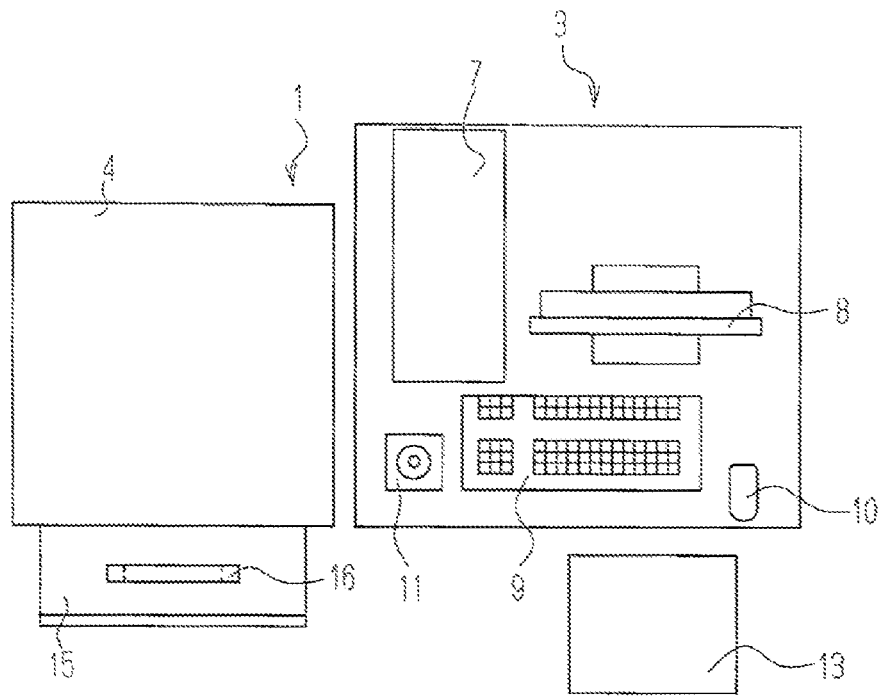
FIG. 1A is a plan view illustrating an outline of a scanning probe microscope according to a first embodiment of the present invention.
Figure 1B:
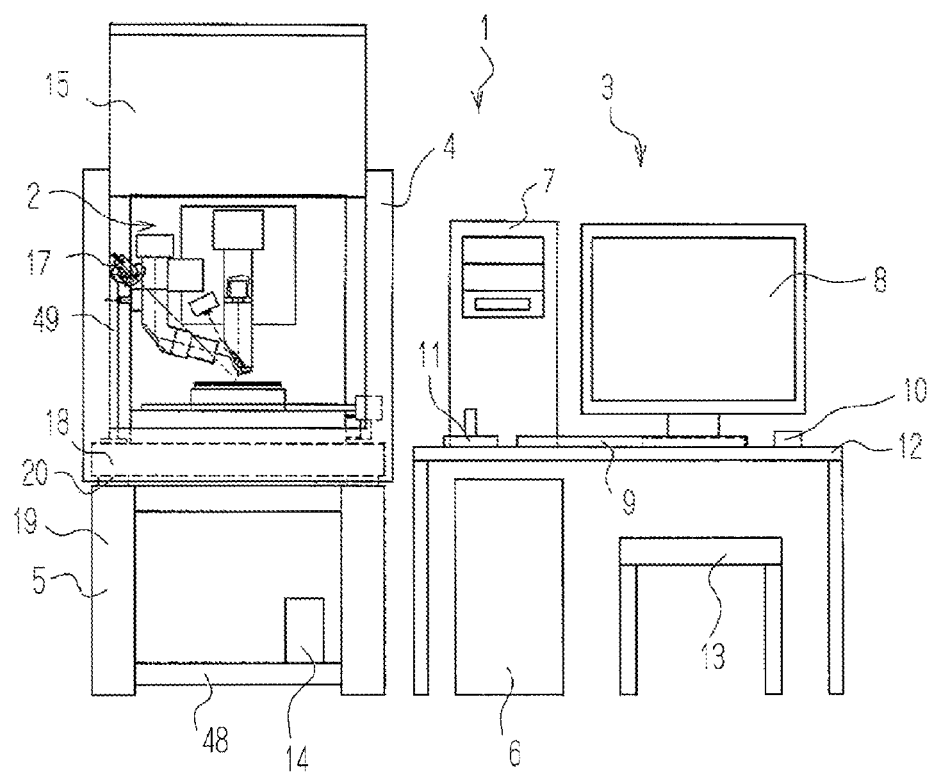
FIG. 1B is a front view illustrating the outline of the scanning probe microscope according to the first embodiment of the present invention.
Figure 2A:
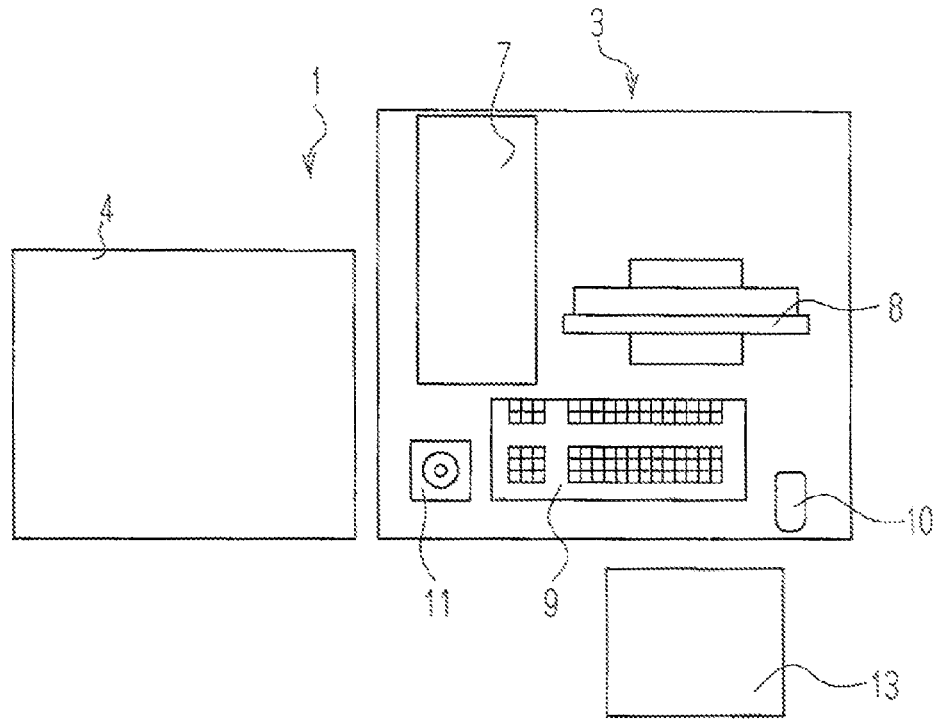
FIG. 2A is a plan view illustrating a state in which a door of a soundproof cover is closed in the scanning probe microscope of FIG. 1.
Figure 2B:
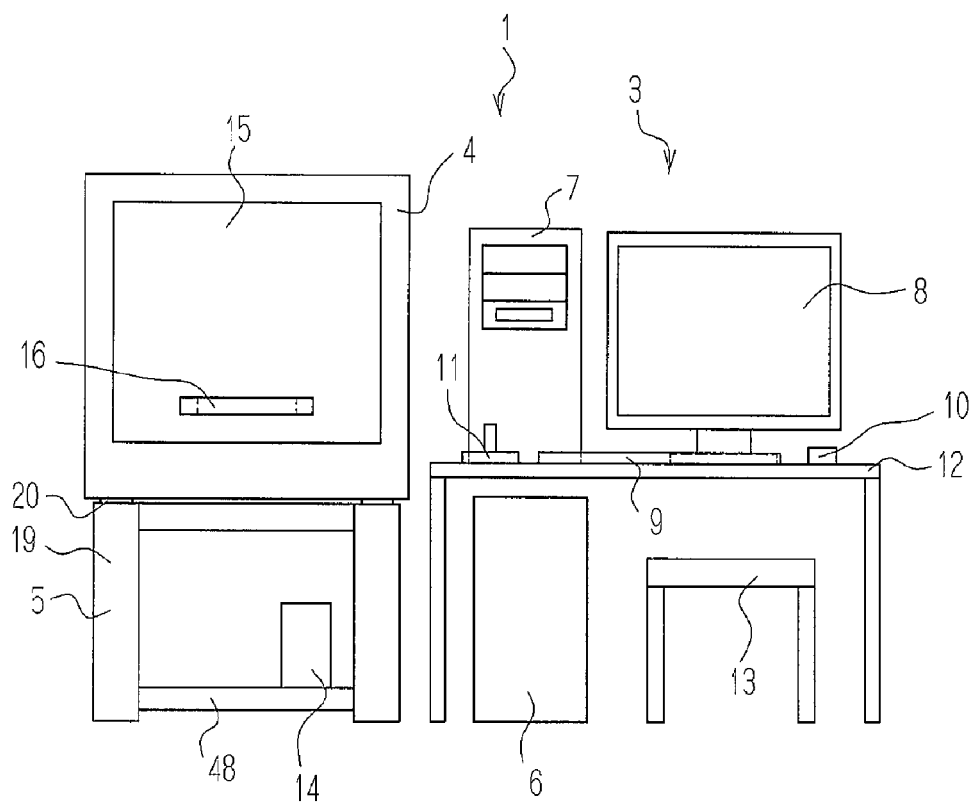
FIG. 2B is a front view illustrating the state in which the door of the soundproof cover is closed in the scanning probe microscope of FIG. 1.
Figure 3A:
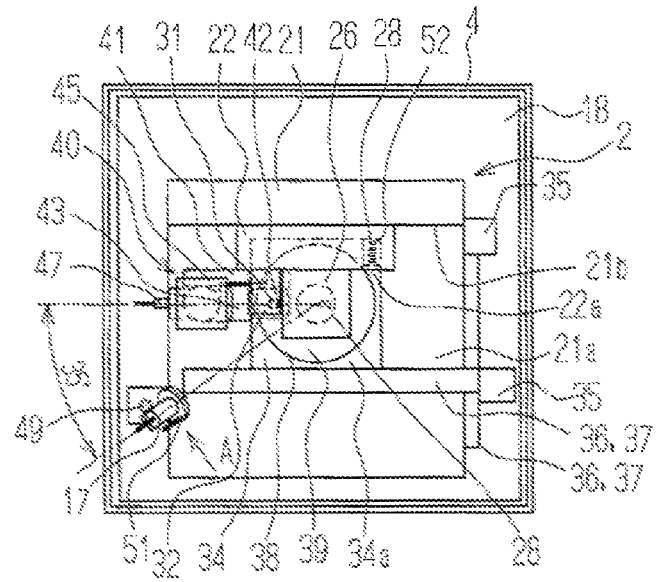
FIG. 3A is a plan view illustrating an outline of a unit section in the scanning probe microscope of FIG. 1.
Figure 3B:
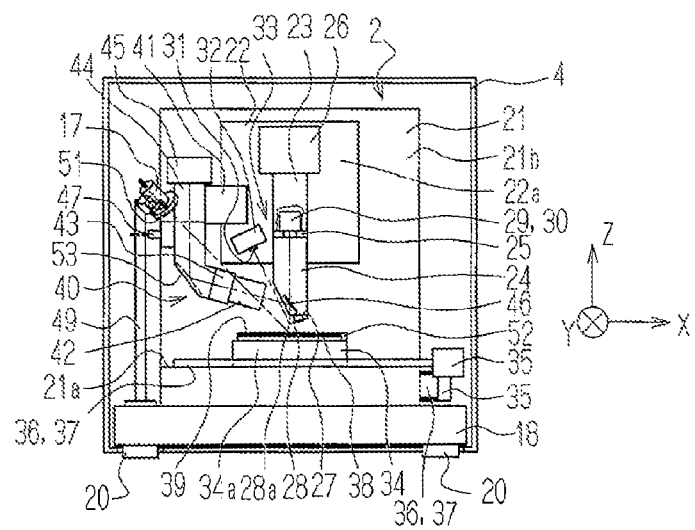
FIG. 3B is a front view illustrating the outline of the unit section in the scanning probe microscope of FIG. 1.
Figure 3C:
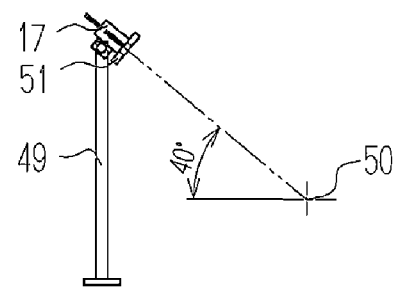
FIG. 3C is a diagram illustrating a layout of a camera viewed from a direction A in FIG. 3A.

FIGS. 1A to 3C are schematic diagrams illustrating configurations of a scanning probe microscope 1 according to a first embodiment of the present invention. FIGS. 1A and 1B illustrate an overall configuration in which a door 15 of a soundproof cover 4 which will be described later is opened. FIGS. 2A and 2B illustrate a state in which the door 15 of the soundproof cover 4 is closed. FIGS. 3A, 3B, and 3C are schematic diagrams illustrating a scanning probe microscope unit section 2 within the soundproof cover 4, in which FIG. 3C is a schematic diagram illustrating a layout of a camera 17 to be described later viewed from a direction A in FIG. 3A.

The scanning probe microscope unit section 2 (hereinafter refer to as "unit") in FIG. 1 is mounted on a surface plate 18 of an anti-vibration table 5 for the purpose of reducing floor vibration during measurement. Also, the unit 2 is arranged within the soundproof cover 4. The soundproof cover 4 is independent from the surface plate 18 of the anti-vibration table 5, and is fixed to a mount 19 of the anti-vibration table 5 through an air spring mechanism 20. A lower side of the surface plate 18 is also covered with the cover 4. The door 15 which is openable upward is disposed on the front of the soundproof cover 4, and at the time of replacement of the sample, replacement of a cantilever, or the operation of adjusting the respective mechanisms associated with the measurement, a measurer moves in front of the unit 2, grips a handle 16 disposed on the door 15, and opens the door 15 to perform the operation. Also, during the measurement, as illustrated in FIG. 2, the door 15 is closed to reduce an influence of sound, wind, a change in temperature, and light from the external, and the measurement is performed.

Next to the unit 2, a control device 3 including a controller 6, a computer 7, a display 8, a keyboard 9, a mouse 10, and a joystick 11 is arranged on a desk 12. The control device 3 is connected to the unit 2. Also, a chair 13 is placed in front of the desk 12, and the measurer normally sits on the chair 13, and operates the keyboard 9, the mouse 10, and the joystick 11 while watching the display 8, and the measurement is performed.

Subsequently, the unit section 2 will be described in detail with reference to FIG. 3. A base 21 configured by a stone surface plate having an L-shaped structure is mounted on the surface plate 18 of the anti-vibration table 5. In the following description, in the front view of FIG. 3B, a lateral direction of a horizontal plane 21a of the L-shaped structure is defined as an X-axis, a direction orthogonal to the X-axis on the horizontal plane is defined as a Y-axis, and a direction of a vertical plane 21b of the base 21 orthogonal to the X and Y-axes is defined as a Z-axis. The vertical plane 21b of the base 21 is fixed with a Z-stage (vertical coarse transfer mechanism) 22 having a driving surface 22a driven by a stepping motor, a linear guide, and a hall screw (not shown). The Z-stage 22 is fixed with a scanner 26 in which two cylindrical piezoelectric elements are coupled to each other through a center coupling member 25, and an electrode is disposed so that an upper piezoelectric element functions as a horizontal fine transfer mechanism 23, and a lower piezoelectric element functions as a vertical fine transfer mechanism 24. In this embodiment, maximum transfer amounts of the scanner 26 are 100 μm in the X and Y-directions, and 10 μm in the Z-direction. A tip of the scanner 26 is fixed with a cantilever holder 27, and the cantilever holder 27 is fixed with a cantilever 28 having a probe 28a at a tip thereof. In this embodiment, the cantilever 28 is 125 μm in the longitudinal direction, 30 μm in width, 15 μm in height of the probe 28a at the tip, and made of silicon. However, the cantilever having another shape can be fitted according to the kind of sample or the purpose of measurement, and can be replaced with a fresh one if the cantilever has been worn.

A semiconductor laser 29 and a condenser lens 30 are disposed inside of the scanner 26, and the spot of the semiconductor laser 29 is condensed on a back surface of the cantilever 28. A laser beam reflected from the back surface of the cantilever 28 is guided onto a photodetector 31 having a surface divided into four portions, and the amount of displacement and the amount of twist of the cantilever are detected by the transfer of the spot on the photodetector 31. The photodetector is fixed to a biaxial stage 32 for adjusting the spot to the center of a light receiving surface. A displacement detection mechanism 33 of the optical lever system is configured by the semiconductor laser 29, the condenser lens 30, the photodetector 31, and the biaxial stage 32.

An XY stage (horizontal coarse transfer mechanism) 34 having a driving face 34a movable within the horizontal plane (X and Y directions) is disposed on the horizontal plane 21a of the base 21. The XY stage 34 transfers the driving face 34a by stepping motors 35, linear guides 36, and ball screws 37 disposed in the respective axial directions. Also, a sample holder 38 is fitted to the XY stage 34. The sample holder 38 according to this embodiment has a sample mounting surface of 8 inches (about 203 mm) in diameter at the maximum.

Further, the Z-stage 22 is fixed with an optical microscope 40 for observing the cantilever 28 and a sample 39 through a coupling member 41. The optical microscope 40 includes an objective lens 42 that is a ten-fold magnification, 34 mm in the operation distance, and 0.28 in numerical aperture, a focus adjustment mechanism 43 that transfers the objective lens 42 in the optical axis direction by a DC motor, a zoom tube 44 having an intermediate lens driven by the DC motor for the purpose of making the size of the viewing field variable, and a CMOS camera 45 having a CMOS image sensor of ⅓ inches for converting a light observed by the objective lens 42 into an image signal. An optical axis of the objective lens 42 is inclined by 15° with respect to the X-axis of the sample. However, the optical axis is bent by a half mirror 46 attached to a tip of the vertical fine transfer mechanism 24 of the scanner 26 so that the cantilever 28 and the sample 39 surface can be observed from the Z-direction perpendicular to the sample 39 surface. Also, a total reflection mirror 53 for converting an optical path is also disposed between the objective lens 42 and the intermediate lens 44.

The optical microscope 40 employs an optical zoom in which a zoom magnification is about 1 to 7 fold, and an observable viewing field size is can be changed between 1.0 mm×1.33 mm to 0.14 mm×0.19 mm in squares. Also, the optical microscope 40 is provided with an illumination device 47 formed of a spot illumination lamp on which an LED light emitting element is mounted, and the sample surface 39 is irradiated with an epi-illumination lamp coaxial with the optical axis of the objective lens 42. A power supply 14 for driving a light source of the LED illumination device 47 is placed on a rack under the anti-vibration table 5 (refer to FIGS. 1 and 2). The power supply 14 is connected to the computer 7 of the control device 3, and on/off operation of the illumination lamp and the adjustment of brightness can be performed by software installed in the computer 7.

Also, in this embodiment, the camera 17 that can observe an area larger than the viewing field of the optical microscope 40 is provided in addition to the optical microscope 40.

The camera 17 is configured by a camera lens whose focus can be adjusted by a voice coil motor, and a CMOS image sensor (detailed structure is not shown).

The camera lens is configured to be focused at a position distant from an object by 5 cm or more, and an autofocus function having a field angle of 75° by the voice coil motor is provided.

The camera 17 is installed obliquely upward with respect to the sample holder surface 38, and fixed to the surface plate 18 of the anti-vibration table 5 by a pole 49. The image picked up by the camera 17 is arranged so that a position at which the cantilever 28 comes into contact with the sample holder surface 38 becomes substantially in the center. FIG. 3C is a diagram of the camera 17 viewed from a direction A in FIG. 3A. When a line 50 of a cross is set as a contact point of the probe 28a and the sample holder surface 38, the optical axis is set at an angle of 40° (50° to the Z-axis) to the sample 39 surface placed on the sample holder 38. Also, in the top view illustrated in FIG. 3A, the optical axis is set at an angle of 35° to the X-axis direction.

Also, the tip of the camera 17 is attached with an illumination lamp 51 in which LED light emitting elements are arranged around the camera lens in the shape of a ring, and the entire viewing field can be illuminated along the optical axis of the camera 17. A light source of the illumination lamp 51 is connected to the same power supply 14 as that of the LED spot light 47 of the optical microscope 40, and the on/off operation of the illumination lamp, and the adjustment of brightness can be performed by the control device as with the illumination device 47 of the optical microscope 40.

This camera is connected to the computer 7 of the control device 3 through a USB cable, the display 8 of the control device 3 is also used as the image display device of the camera 17, and the image is enlarged and displayed on the display 8 at a 1 to 5 fold zoom magnification by digital zoom with the aid of the software installed in the computer 7. Also, in the software, the focus can be switched to manual focus, the voice coil motor of the camera 17 can be moved on the software to manually perform the focus adjustment. Also, when the image is enlarged by the digital zoom, a function of setting the center of an enlarged area by the software is provided, and when the observation position is displaced due to the digital zoom, the observation area can be adjusted.

The viewing field observable by the camera 17 falls within about 285×220 mm to 57×44 mm in squares, and is set so that the 8-inch overall surface of the sample holder 38 can be observed in the maximum viewing field. The sample 39 and the cantilever 28 can be observed in an area sufficiently wider than the maximum viewing field of the optical microscope.

Subsequently, an operation procedure of the scanning probe microscope according to this embodiment will be described. The operation procedure is limited to a portion necessary for understanding the present invention, and a part of the procedure will be omitted.

1) Installation of Sample

The measurer moves in front of the unit 2, opens the door 15 of the soundproof cover 4, moves the XY stage 34 short in the Y-axis direction, and mounts the sample on the sample holder 38. In this embodiment, a silicon wafer which is 8 inches in diameter is measured as the sample holder 38.

2) Attachment of Cantilever and Adjustment of Displacement Detection Mechanism

The cantilever 28 is placed on a cantilever attachment table 52 located on an end of the XY stage, and the door 15 of the soundproof cover 4 is closed for the measurement. Also, for replacement of the cantilever 28 due to abrasion, or replacement of the cantilever 28 with a different type due to a measurement purpose, a plurality of cantilevers 28 suiting the purpose is prepared in advance. After the door 15 has been closed, the measurer moves in front of the control device 3, sits on the chair 13, and continues the operation while watching the display 8.

The XY stage 34 is automatically driven with a selection of a cantilever replacement command on the software, the cantilever holder 27 moves immediately above the cantilever 28, and the Z-stage 22 is automatically brought closer to the cantilever holder 27 and the cantilever 28 until immediately before the cantilever holder 27 is brought into contact with the cantilever 28.

In this situation, the laser spot observation of the cantilever 28 and the displacement detection mechanism 33 on the display 8 can be performed by turning on the illumination device 47 of the optical microscope 40, and focusing the objective lens 42.

The measurer finely adjusts the XY stage 34 while confirming the optical microscope on the display 8, and positions the laser spot on the back surface of the cantilever 28. The cantilever holder 27 is connected with a vacuum pump (not shown), and the Z-stage 22 is further brought closer to the cantilever holder 27 and the cantilever 28 whereby the cantilever 28 is adsorbed to the cantilever holder 27 to set the cantilever 28.

Thereafter, the light reflected from the back surface of the cantilever 28 is emitted onto the detector surface 31 divided in four pieces. The quartered detector 31 is provided with the biaxial stage 32. The detector 31 is transferred on the software to position the laser spot on the detector surface in the center of the detector 31.

3) Positioning of Measurement Position

The Z-stage 22 is separated from the cantilever attachment table 52. Then, the illumination lamp 51 of the camera 17 is turned on to display the camera image on the display 8. In this situation, the entire cantilever 28 and sample 39 can be confirmed in the viewing field.

The XY stage 34 and the Z-stage 22 is transferred by the measurer operating the stage driving command of the software or the joystick 11 while watching the display 8 so that the portion to be measured of the sample 39 comes immediately below the cantilever 28.

The positioning may be performed by only the image of the camera 17. However, because the image of the camera 17 is an oblique image, it is difficult to recognize whether the portion to be measured of the sample 39 is present immediately below the cantilever 28, or not, on the display 8.

Under the circumstance, if the illumination device 47 of the optical microscope 40 is kept on, the spot of the illumination device 47 of the optical microscope 40 can be emitted onto the sample surface 39 so that the spot can be confirmed by the image of the camera 17. Therefore, the positioning is performed with high precision by transferring the portion to be measured of the sample 39 to the position of the spot by using the position of the spot as the mark.

Also, the laser spot of the displacement detection mechanism 33 may be used as a mark instead of the spot of the illumination device 47 of the optical microscope 40. The laser spot is shaped into an oval that is about 50 μm in a long axis, and about 10 μm in a short axis, and is set so that the long axis matches a width direction of the cantilever 28. Therefore, because the spot of the laser is larger than a width of the cantilever 28, the light spread out of the cantilever 28 can be observed as the spot on the sample 39 surface. The spot can be positioned while confirming the image of the camera 17.

In the positioning using the image from the camera 17, the positioning is performed by narrowing the viewing field and enlarging the image with the use of the function of the digital zoom, as the cantilever 28 and the sample 39 come closer to each other. Accordingly, the positioning can be performed with higher precision. The enlargement of the image is not limited to the digital zoom, but can be performed by optical zoom by providing of a zoom lens that can be operated remotely in the camera 17.

When the viewing field is narrowed by the zoom function to enlarge the image, it is frequently difficult to focus a neighborhood of the tip of the cantilever 28 by the autofocus provided in the camera 17. In this case, an autofocus function is switched to a manual focus function by software for operating the camera 17 to enable focusing by the manual focus.

Also, by enlarging and observing the probe tip in the image of the camera 17 and transferring the cantilever 28 in the Z-direction, the probe 28a can be brought closer to the sample surface 39 at a high speed until just before the probe 28a comes into contact with the sample surface 39. In the proximity operation of the probe 28a and the sample 39 in measuring the scanning probe microscope, the probe 28a is frequently brought closer to the sample 39 at a low speed for the purpose of preventing the probe 28a and the sample 39 from being damaged, and it takes long time to perform the proximity operation. However, if the probe 28a and the sample 39 are brought closer to each other by the image of the camera 17 in advance, a time necessary for the proximity operation can be reduced. When confirmation is performed by the image of the camera 17, both of the image of the cantilever 28 and a mirror image of the cantilever 28 on the sample 39 are confirmed so that a distance between those images is confirmed, thereby making it easy to recognize a feeling of distance in a height direction. As a result, the probe 28a and the sample 39 can be brought closer to each other until just before the probe 28a and the sample 39 come in contact with each other.

The positioning of the probe 28a and the sample 39 after coming closer to each other until immediately before the probe 28a and the sample 39 come into contact with each other is performed more precisely in such a manner that the image is switched to the image of the optical microscope 40, and the XY stage 34 is transferred while confirming the enlarged image by the display 8, until the portion to be measured of the sample 39 falls within 100 μm which is a scanning area of the horizontal fine transfer mechanism 23.

4) Measurement

In the operation after the positioning has been performed with the use of the XY stage 34 and the Z-stage 22, the probe 28a and the sample 39 are automatically brought closer to each other by operation software of the scanning probe microscope until the probe 28a and the sample 39 fall within the measurement area. Thereafter, the measurement parameter is adjusted to measure the displacement and the amount of amplitude of the cantilever 28 by the displacement detection mechanism 33. Then, the scanning operation is performed by the horizontal fine transfer mechanism 23 while adjusting the height by the vertical fine transfer mechanism 24 to perform the image measurement of the scanning probe microscope. In the measurement, a situation of the measurement may be confirmed while turning on the illumination devices 47 and 51 of the optical microscope 40 and the camera 17. However, the illumination devices 47 and 51 of the optical microscope 40 and the camera 17 may be mixed into the photodetector 31 to produce noise. In this case, the illumination devices 47 and 51 are turned off by the software.

5) Change in Measurement Place and Replacement of Cantilever

When changing the measurement place after the measurement has been completed, after the probe 28a and the sample 39 are distanced from each other by the Z-stage 22, the portion to be measured is again positioned through the procedure of 3) while confirming the image from the camera 17, and the measurement is then performed through the procedure of 4). The amount of retreat of the Z-stage 22 may be slight to the degree of about several tens to several hundreds μm because the measurer does not touch the unit 2 or the soundproof cover 4.

Also, when replacing the cantilever 28, the cantilever is replaced through the procedure of 1). The measurer can perform the above procedures while sitting on the chair 13 in front of the display 8.

6) Measurement Completion

Upon completion of the measurement, the measurer leaves the chair 13, moves in front of the unit 2, opens the door 15 of the soundproof cover 4, and cleans up the sample 39 and the cantilever 28 to complete a sequence of measurement.

In the related art scanning probe microscope, as described above, the measurer moves in front of the unit because the viewing field of the optical microscope is narrow, and needs the observation under direct vision. Here, it takes an enormous amount of work and time for positioning the probe and the sample such as open/close operation of the soundproof cover, adjustment of an in-system atmosphere associated with the open/close operation, or the proximity or distance operation of the probe. Even if the measurer tries to visually recognize the sample from far in front of the display, the measure can hardly view the sample and the precision is degraded. Further, the viewing field is blocked by a side wall of the soundproof cover.

Further, after the door of the soundproof cover has been closed upon completion of the measurement preparation, a situation within the soundproof cover cannot be observed. Therefore, when the sample measurement position is changed by the horizontal coarse transfer mechanism, the measurer needs to again move in front of the unit, open the door of the soundproof cover, and visually confirm the situation within the soundproof cover. Since the unit largely vibrates when the door of the soundproof cover is opened, there is a need to largely distance the probe from the sample, and it takes a lot of time to again bring the probe closer to the sample.

On the other hand, when the measurement is performed by the scanning probe microscope 1 according to this embodiment, the overall area and the positional relationship of the sample 39 and the cantilever 28 can be confirmed by the camera 17. Therefore, after the sample 39 has been set in the sample holder 38, the measurer can operate all of the processes by sitting on the chair 13 and watching the display 8. Thus, the measurement can be extremely efficiently and easily performed, and the positioning precision of the portion to be measured is improved more than the visual recognition. Also, in a dark place which is a light shielding space such as the inside of the soundproof cover 4, the internal situation of the dark place can be observed by the illumination lamps of the illumination devices 47 and 51 which are disposed in the camera 17 and the optical microscope 40.

The measurement place of the sample 39 can be changed while watching a screen of the display 8 without opening the door 15 of the soundproof cover 4. A time required to again bring the probe 28a closer to the sample 39 is shortened because the amount of retreat between the sample 39 and the probe 28a can be slight.

All of the driving portions for the XY stage 34, the Z-stage 22, the focus adjustment mechanism 43 and the zoom tube 44 of the optical microscope 40, and the focus mechanism of the camera 17 are connected to the control device 3, and can be operated remotely. Also, since the illumination devices 47 and 51 can be turned on/off remotely, even if the illumination lamps become the noise source, the illumination devices 47 and 51 can be turned off by the remote operation. Also, when the illumination devices 47 and 51 are formed of LED light sources, the power consumption is small as compared with that of halogen illumination lamps. As a result, the heat generation is small, and the internal temperature hardly rises even if the door 15 of the soundproof cover 4 is kept closed, and the temperature drift during the measurement can be suppressed. Further, since the illumination lamp can be turned off from the external, unnecessary lighting is eliminated, and a rising in the temperature is suppressed.

In this embodiment, a microphone (not shown) is incorporated into the camera 17, and the sound within the soundproof cover 4 can be confirmed by a speaker incorporated into the computer 7. The operation can be performed while hearing a drive sound during driving the XY stage 34, the Z-stage 22, the focus adjustment mechanism 43, or the zoom adjustment mechanism 44. Therefore, the operation having realistic sensation can be performed. Also, when the sample 39 and the cantilever 28 collide with each other within the soundproof cover 4, or a variety of driving mechanisms are in failure, because the sample 39 and the cantilever 28 are surrounded by the soundproof cover 4, the source cannot be recognized from the external. However, if the internal sound is picked up by the microphone, the measurer can recognize the sound when a trouble occurs, and the safety is also improved.

The optical microscope 40 according to this embodiment is intended to position the laser spot of about several tens μm to the cantilever 28 having a size of several hundreds μm order, and to position the probe 28a and the sample 39 within the maximum scanning area of the horizontal fine transfer mechanism 23. Therefore, the maximum viewing angle immediately above the optical axis has a viewing field of an area larger than the maximum transfer amount of the horizontal fine transfer mechanism 23 by one digit. On the contrary, the camera 17 is intended to confirm a wide area of the sample 39, and therefore an angle of the optical axis of the camera 17 is set to an angle different from that of the optical microscope. Also, the maximum viewing field of the camera 17 is observed in an area further larger than the optical microscope 40 by one digit or more.

In this embodiment, the entire area of the sample holder 38 which is 8 inches in diameter can be confirmed by the camera 17. However, although it is preferable that the entire area of the sample holder can be observed as in this embodiment, there are cases in which the layout position of the camera is too far and the layout is problematic, or cases in which when the zoom mechanism is used, the zoom magnification is short, and the enlarged image cannot be clearly confirmed. For this reason, for the purpose of positioning the sample 39 and the cantilever 28, if the maximum viewing field is about ¼ or more, the positioning using the camera 17 can be performed without degrading the operability.

Also, when the angle of the camera 17 is set to a shallow angle to the sample surface 39, the positional relationship between the cantilever 28 and the sample 39 within the plane is hardly recognized. Therefore, it is preferable that the optical axis of the camera 17 is set to 30° or larger to the sample surface 39. When the optical axis of the camera 17 is perpendicular to the sample surface 39, the camera 17 is arranged immediately above the sample 39. In this case, in a normal configuration, components of the unit interrupt the viewing field, and it is difficult to recognize the sample 39 and the cantilever 28 at the same time. Also, in order to perform the positioning in the horizontal direction, and a distance confirmation between the probe 28a and the sample 39 in the vertical direction by one camera, it is preferable that the optical axis of the camera 17 to the sample surface 39 is set to be equal to or larger than 30°, and smaller than 60°.

Also, the visual recognition at an arbitrary portion of the unit can be performed by mounting a pan, a tilt mechanism, and an XYZ stage which can be operated from the external in the camera 17, and operating the position of the camera 17 remotely.

Further, a plurality of cameras is installed, and the operation is performed while confirming images from a variety of angles, as a result of which the internal situation can be recognized from various perspectives to improve the operability.

Second Embodiment

Figure 4A:
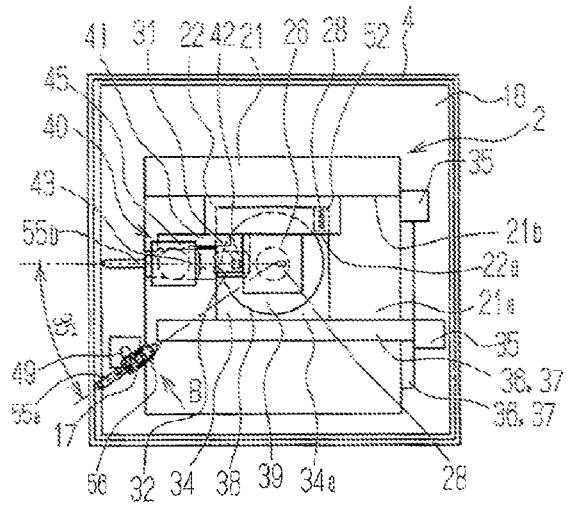
FIG. 4A is a plan view illustrating an outline of a unit section in a scanning probe microscope according to a second embodiment of the present invention.
Figure 4B:
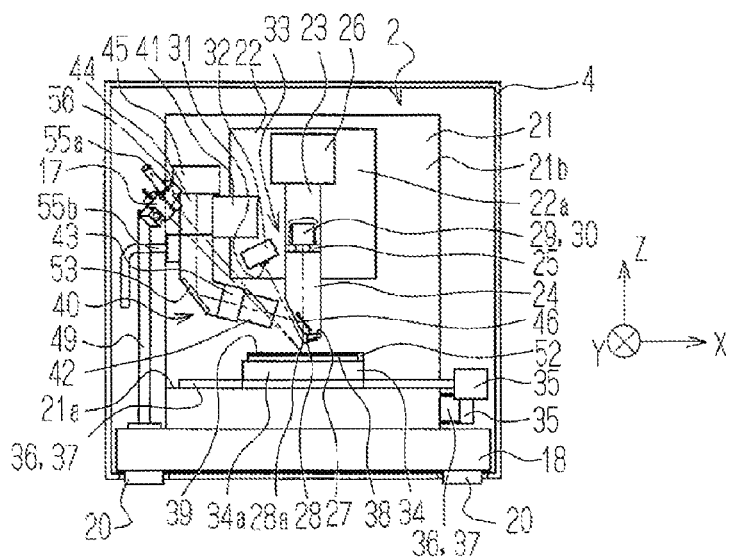
FIG. 4B is a front view illustrating the outline of the unit section in the scanning probe microscope according to the second embodiment of the present invention.
Figure 4C:
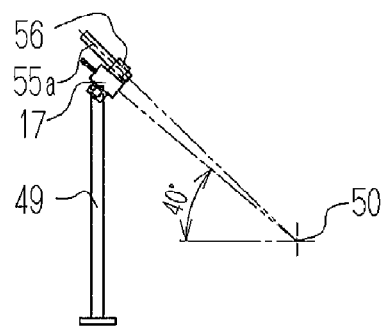
FIG. 4C is a diagram illustrating a layout of a camera viewed from a direction B in FIG. 4A.

FIGS. 4A and 4B are schematic diagrams of a scanning probe microscope unit section 2 according to a second embodiment of the present invention, and FIG. 4C is a schematic diagram illustrating a layout of the camera 17 viewed from a direction B in FIG. 4A. Also, FIG. 5 is a schematic diagram of an LED light source 54 for illumination of the camera 17 and the optical microscope 40.

The second embodiment is identical in configuration with the first embodiment except for the illumination of the unit 2 in this embodiment, and therefore the same components in the drawings are denoted by identical reference numerals, and a description of a structure of the device and a measurement procedure will be omitted.

Figure 5:
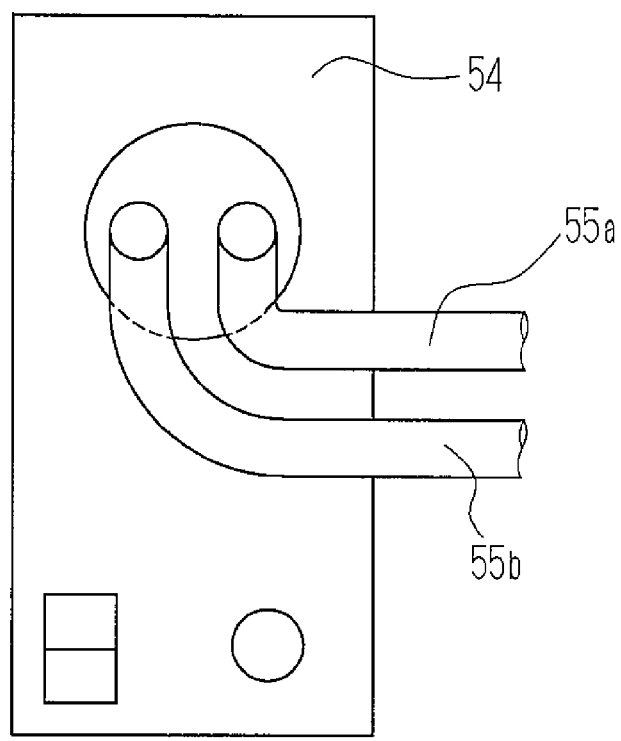
FIG. 5 is a diagram illustrating an outline of a light source used in the second embodiment of the present invention.

In this embodiment, the LED light source 54 in FIG. 5 is placed on a mount under an anti-vibration table 5, and light guides 55 configured by two branched optical fiber bundles is connected to the LED light source 54.

The respective light guides 55 are connected to the optical microscope 40 and the camera 17, and used as illumination during observation. A light guide 55a connected to the optical microscope 40 passes through a microscope tube, and illuminates the sample 39 through the objective lens 42 as in the first embodiment.

The camera 17 is equipped with a light guide fitting jig 56 on an upper portion thereof, and a light guide 55b is installed in the vicinity of an intersection of the probe 28a and the sample holder 38 to illuminate an observation area of the camera 17. Because a light output from the light guide 55b is spread at about 70°, the light can illuminate the overall observation viewing field.

Also, in this embodiment, the illumination lamps can be turned on/off, and the brightness can be adjusted on software.

In a normal use state, the observation using the optical microscope 40 is performed subsequently to the observation using the camera 17. Also, for the purpose of preventing noise during measurement, the illumination lamps are frequently turned off at the same time. Therefore, even if one light source 54 is shared between the camera 17 and the optical microscope 40, there arises no operational problem.

In this embodiment, because one LED light source 54 is shared between the camera 17 and the optical microscope 40, the costs can be suppressed.

Also, a heat generation within the soundproof cover 4 can be suppressed because the LED light source 54 is arranged outside of the soundproof cover 4, and the illumination is introduced by the light guides 55a and 55b, and a temperature drift is prevented.

Third Embodiment

Figure 6A:
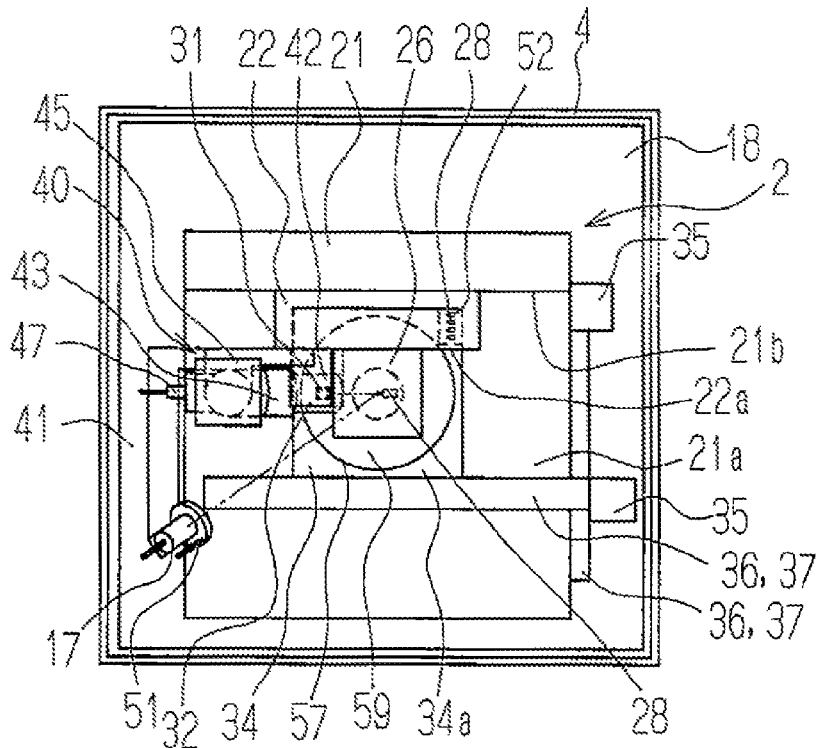
FIG. 6A is a plan view illustrating an outline of a unit section in a scanning probe microscope according to a third embodiment of the present invention.
Figure 6B:
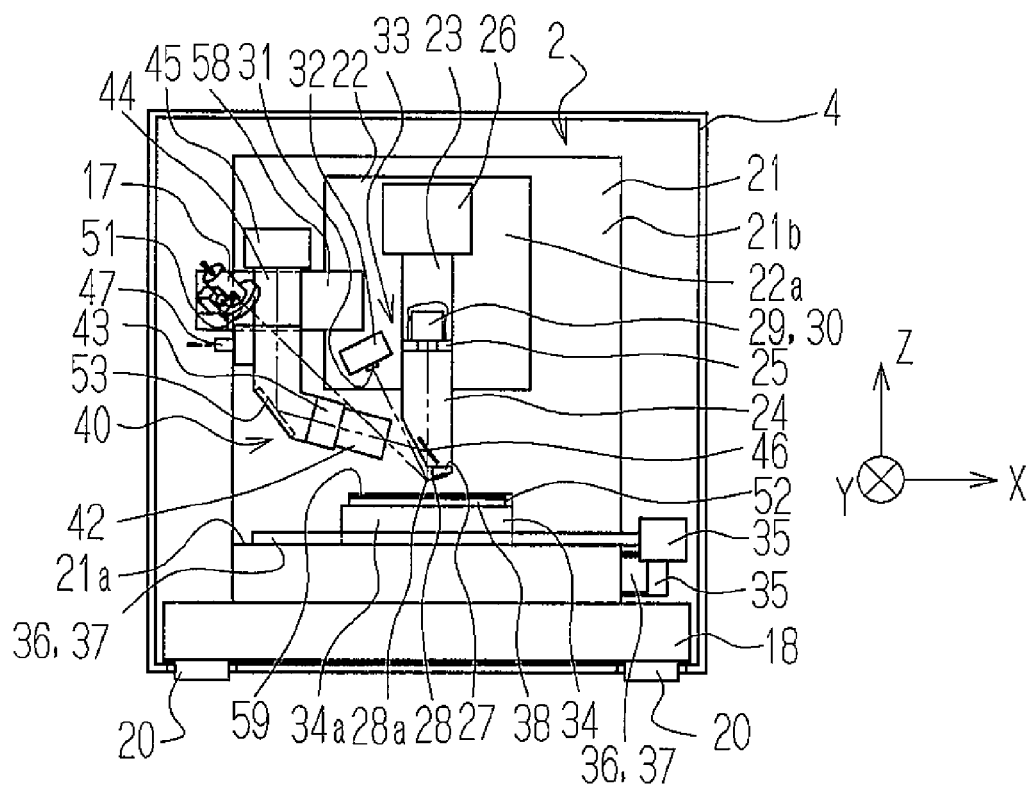
FIG. 6B is a front view illustrating the outline of the unit section in the scanning probe microscope according to the third embodiment of the present invention.

FIG. 6 is a schematic diagram illustrating a unit section of the scanning probe microscope according to a third embodiment of the present invention.

This embodiment is identical in configuration with the first embodiment except for the fitting method of the camera 17 and a size of a sample holder 57, and therefore the same components in the drawings are denoted by identical reference numerals, and a description of a structure of the device and a measurement procedure will be omitted.

In this embodiment, the camera 17 is fitted to a stay 58 installed to the Z-stage 22 so that the cantilever 28 can be always confirmed in the center of the camera 17. Also, a sample 59 which is 12 inches or lower in diameter can be mounted on the sample holder 57.

In the first embodiment, the camera 17 is fixed independently from the XY stage 34 and the Z-stage 22, and the viewing field of the camera 17 is not interlocked with the transfer of the XY stage 34 and the Z-stage 22. Because the viewing field of the camera 17 is wide, this fixing method is not problematic when the sample 59 is equal to or smaller than a given size. However, if the sample 59 becomes larger, the cantilever 28 and the sample 59 may fall outside the viewing field.

In this embodiment, even if the Z-stage 22 operates vertically, the viewing field is interlocked with the transfer of the Z-stage 22, and the cantilever 28 can be always confirmed, and does not fall outside the viewing field. As a result, the amount of transfer of the Z-stage 22 can be increased, and can deal with a thick sample.

Also, the XY stage can be provided on the cantilever side. Also in this case, the camera is fixed to the XY- and Z-stages, and moved fixedly integrally in association with the XYZ stage. As a result, the position of the sample relative to the cantilever can be always confirmed, and this embodiment can be applied to a large-sized sample having a larger area.

Fourth Embodiment

Figure 7:
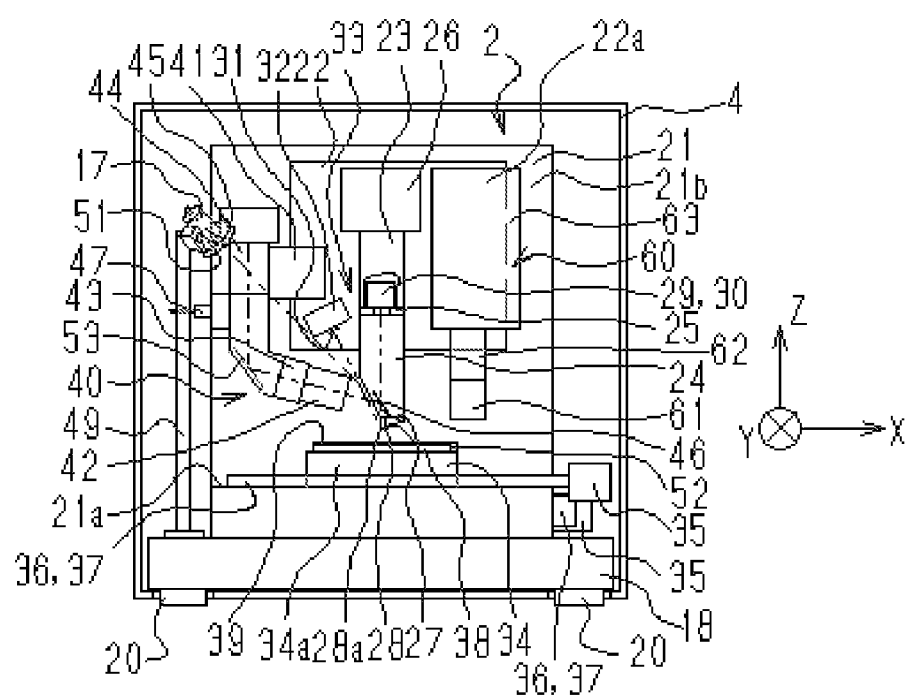
FIG. 7 is a front view illustrating an outline of a unit section in a scanning probe microscope according to a fourth embodiment of the present invention.

FIG. 7 is a schematic diagram illustrating a unit section of a scanning probe microscope according to a fourth embodiment of the present invention.

In this embodiment, the same constituent potions as those in the first embodiment are denoted by identical reference numerals in the drawings, and a description of the structure of the device and a measurement procedure will be omitted.

This embodiment is directed to a device in which a white light interferometer 60 that observes the irregularity of the sample 39 surface is combined with the scanning probe microscope unit section 2.

The white light interferometer 60 includes an objective lens 61 of a 10-fold magnification, a piezoelectric actuator 62 that performs scanning with the objective lens 61 in the optical axis direction by 100 μm, and a CCD camera having an intermediate tube, an illumination lamp from the LED, and a light receiving surface of ⅓ inches (the intermediate tube, the LED illumination lamp, and the CCD camera are configured within a housing 63). The objective lens 61 generally has a Mirau type configuration in which a mirror for reference surface is disposed within the objective lens 61, and a reference light from the LED interferes with a reflected light from the sample 39 to generate an interference fringe. In the white light interferometer 60, the interference fringe caused by the irregularity of the sample 39 surface when the piezoelectric actuator 62 is driven in the optical axis direction is detected by the respective pixels of the CCD camera, and the irregularity of the sample 39 surface is measured according to information on light and dark of the interference fringe with high resolution. The control of the white light interferometer 60 is also performed by the control device of the scanning probe microscope, and measurement data is displayed on the same display.

In this embodiment, with the use of the objective lens 61 of the 10-fold magnification, the measurement of the white light interferometer 60 is performed in the viewing field of 1000 μm×700 μm.

The scanning probe microscope unit 2 and the white light interferometer 60 share the XY stage 34 and the sample holder 38 with each other. After the measurement area wider than 100 μm, which is the measurement area of the scanning probe microscope, is measured by the white light interferometer 60, an arbitrary place of the measurement data on the display is designated. The arbitrary place is transferred by the amount of offset between the optical axis center of the objective lens 61 of the white light interferometer 60 which is predetermined by the horizontal coarse transfer mechanism 34, and the probe 28*a*, by the horizontal coarse transfer mechanism 34, and precise measurement in a range narrower than the white light interferometer 60 is performed by the scanning probe microscope.

The above combination of the white light interferometer with the scanning probe microscope has such advantageous effects that the resolution of the white color interferometer in the horizontal direction which is restricted by an optical limit is measured with high resolution by the scanning probe microscope, and whether the measurement data of the white light interferometer includes an optical measurement error, or not, can be cross-checked by the scanning probe microscope, and also that the mechanical characteristics and the electrical characteristics can be measured by the scanning probe microscope in an arbitrary place of the measurement data in the white light interferometer.

In this embodiment, the vertical coarse transfer mechanism 22 is also shared between the scanning probe microscope unit and the white light interferometer 60. Alternatively, respective different vertical coarse transfer mechanisms may be provided for the scanning probe microscope unit and the white light interferometer 60.

In this embodiment, the cantilever 28 of the scanning probe microscope, and the focal position of the objective lens 61 of the white light interferometer can be observed within the maximum viewing field of the camera 17 at the same time.

With the above arrangement, the probe 28*a* or the focal point of the objective lens 61 can be positioned at the measurement place of the sample 39 during the observation by the white light interferometer 60 and the observation of the cantilever 28, respectively. When the optical axis center of the objective lens 61 of the white light interferometer 60 is positioned at the place to be measured of the sample 39, the spot of the LED illuminated to the sample 39 from the objective lens 61 can be used a mark.

Also, because the situation of the movement of the sample 39 between both of the units can be confirmed, if a portion having a large irregularity is present between both of the units, the irregularity is recognized by the image of the camera in advance, thereby being capable of preventing the collision of the objective lens 61 and the cantilever 28.

When a local position of the probe 28*a* or the objective lens 61 is observed, the respective places can be enlarged and observed by the zoom mechanism of the camera 17.

In this embodiment, the white light interferometer is combined with the scanning probe microscope. Alternatively, for example, an arbitrary optical measurement/analysis/observation device such as a laser microscope, an optical microscope, or a microspectroscopic device may be combined together. Also, measurement heads of a plurality of scanning probe microscopes may be combined together. In this case, the maximum scanning ranges of the horizontal fine transfer mechanisms and the vertical fine transfer mechanism of the respective measurement heads are configured differently from each other, as a result of which as in the white light interferometer, the coarse scanning with a wide range to the precise scanning with a narrow range can be sequentially implemented with the use of the positioning method of the present invention.

The specific embodiments have been described above. However, the present invention is not limited to the above embodiments, but includes various modifications and equivalents encompassed in the concept of the present invention.

For example, the structure and type of the camera and the optical microscope are not limited to the above embodiments, but arbitrary configurations can be used. As the camera, a web camera is also within in the scope of the present invention if the web camera is applicable to the present invention.

Also, the camera can be fixed at arbitrary fixing places such as within the cover in addition to the above embodiments.

Also, the soundproof cover is not essential, and even when the cover is not provided, all of the operation can be performed in front of the display with the use of the camera of the present invention, to thereby remarkably improve the operability.

Further, the image display of the camera can be confirmed at a place distant from the unit with the use of the Internet. In this case, even if the measurer is not close to the unit, the measurement state of the device can be confirmed, or the remote control of measurement can be performed.

Also, in addition to the soundproof cover, the invention can be used in a cover having an arbitrary configuration such as a windproof cover, a lightproof cover, a chamber for establishing a vacuum or a gas atmosphere, or a globe box.

Also, the control of illuminating the camera and the optical microscope may be performed by a handy switch other than a method of implementing the control on the software. Also, the display for image display may use an independent image display device without being shared with the scanning probe microscope.

Also, regarding the structure of the scanning probe microscope, the vertical fine transfer mechanism and the vertical coarse transfer mechanism may be disposed on the sample side other than the structure having the vertical fine transfer mechanism and the vertical coarse transfer mechanism on the cantilever side, or may be divided to the cantilever side and the sample side.

Also, the attachment of the cantilever may be manually performed before the measurement, and as a method of positioning the optical lever spot to the cantilever, a laser may be equipped with a stage and may be transferred. The shapes of the probe and the cantilever may be arbitrarily applied, and the horizontal fine transfer mechanism and the vertical fine transfer mechanism are also not limited to the cylindrical piezoelectric element, but a stacked piezoelectric element, a stage in which the stacked piezoelectric element is combined with a parallel leaf spring or a displacement enlargement mechanism, or a mechanical stage that operates by an electromagnetic motor or a voice coil motor, are arbitrarily applicable.

Also, as the displacement detection method of the cantilever, a self-detection system in which a resistor is provided in the cantilever to detect a displacement due to a change in resistance value can be also used other than the optical lever system. Also, in the self-detection system, because the light can become the noise source as in the optical lever system, the cover is frequently used, and because the sample and the cantilever cannot be visually recognized as in the above optical lever system, it is remarkably significant to use the present invention.

Also, the scanning probe microscope according to the present invention is not limited to an image measurement purpose, but can also be applied to various physical property measurements such as viscous elasticity measurement, electric characteristics, a frictional force, a magnetic force, or optical characteristics.

The present invention provides illustrative, non-limiting aspects as follows:

(1) In a first aspect, there is provided a scanning probe microscope including: a scanning probe microscope unit section including, a cantilever having a probe at a tip thereof, a cantilever holder configured to fix the cantilever, a sample holder on which a sample is configured to be placed, a horizontal fine transfer mechanism configured to relatively scan a surface of the sample with the probe, a vertical fine transfer mechanism configured to control a distance between the probe and the sample surface, a horizontal coarse transfer mechanism and a vertical coarse transfer mechanism which are larger in operation range than the horizontal fine transfer mechanism and the vertical fine transfer mechanism, and an optical microscope configured to observe the cantilever and the sample; a control device configured to control the scanning probe microscope; an imaging device having an observation axis non-coaxial with an optical axis of the optical microscope, and to which a viewing field, which is wider than that of the optical microscope and capable of observing the cantilever and the sample at the same time, can be set; and an image display device including a first image display configured to display an image observed by the optical microscope and a second image display configured to display an image observed by the imaging device.

(2) In a second aspect, there is provided the scanning probe microscope according to the first aspect, further including: a cover configured to cover the scanning probe microscope unit section, wherein the imaging device is housed within the cover, and a state inside the cover can be observed by the imaging device when the cover is closed.

(3) In a third aspect, there is provided the scanning probe microscope according to the first aspect, wherein an area which is ¼ or larger than an area of the sample holder can be observed by the viewing field of the imaging device.

(4) In a fourth aspect, there is provided the scanning probe microscope according to the first aspect, further comprising: an illumination lamp including a first illumination lamp and a second illumination lamp, the first illumination lamp configured to illuminate the viewing field of the imaging device.

(5) In a fifth aspect, there is provided the scanning probe microscope according to the fourth aspect, wherein the illumination lamp can be turned on and off by remote control.

(6) In a sixth aspect, there is provided the scanning probe microscope according to the fourth aspect, wherein the illumination lamp includes a light source having an LED light emitting element arranged in the scanning probe microscope unit section or an arbitrary light source installed in a place distant from the scanning probe microscope unit section, from which a light is propagated to the scanning probe microscope unit section by a light guide.

(7) In a seventh aspect, there is provided the scanning probe microscope according to the fourth aspect, wherein the second illumination lamp is configured to illuminate the viewing field of the optical microscope, and wherein light is supplied to the first illumination lamp and the second illumination lamp from a common light source.

(8) In an eighth aspect, there is provided the scanning probe microscope according to the first aspect, wherein an angle an observation axis of the imaging device with respect to the sample surface is equal to or larger than 30° and equal to or smaller than 90°.

(9) In a ninth aspect, there is provided the scanning probe microscope according to the first aspect, wherein the imaging device has a zoom function, and wherein the first image display is configured to display an image obtained by enlarging an area smaller than a maximum viewing field observable by the imaging device.

(10) In a tenth aspect, there is provided the scanning probe microscope according to the first aspect, wherein at least one of the horizontal coarse transfer mechanism and the vertical coarse transfer mechanism has an actuator configured to be operated remotely, and wherein the at least one of the horizontal coarse transfer mechanism and the vertical coarse transfer mechanism is configured to be operated remotely while confirming an image displayed on the image display device.

(11) In an eleventh aspect, there is provided the scanning probe microscope according to the first aspect, wherein the scanning probe microscope unit section includes a plurality of scanning probe microscope measurement head sections each including the cantilever having the probe, the cantilever holder, the horizontal fine transfer mechanism, the vertical fine transfer mechanism, and a displacement detection mechanism, wherein the plurality of scanning probe microscope measurement head sections shares the sample holder and the horizontal coarse transfer mechanism with each other, and wherein the imaging device is configured to observe the cantilevers of the plurality of scanning probe microscope measurement head sections and the sample at the same time.

(12) In a twelfth aspect, there is provided the scanning probe microscope according to the eleventh aspect, wherein a position between at least one of the plurality of probes provided in the scanning probe microscope unit section and the sample are adjusted by using the image displayed on the image display device.

(13) In a thirteenth aspect, there is provided the scanning probe microscope according to the eleventh aspect, wherein the optical microscope has an illumination lamp that emits an illumination light along the optical axis, wherein the illumination light emitted onto the surface of the sample of the optical microscope is observed by the imaging device, and at least one of the plurality of probes provided in the scanning probe microscope unit section and the sample are positioned by using a spot of the illumination light as a mark.

(14) In a fourteenth aspect, there is provided the scanning probe microscope according to the eleventh aspect, further including: a displacement detection mechanism of an optical lever system configured to emit a laser beam onto a back surface of the cantilever and detect a reflected light from the cantilever by a detector, wherein when a laser spot is positioned on a back surface of the cantilever, a leak light of the laser spot emitted onto the sample surface, which is spread out of the cantilever, is observed by the imaging device, and at least one of the plurality of probes provided in the scanning probe microscope unit section and the sample are positioned by using the leak light as a mark.

(15) In a fifteenth aspect, there is provided the scanning probe microscope according to the first aspect, wherein the scanning probe microscope unit section includes an optical device having an objective lens having a viewing field narrower than a maximum viewing field of the imaging device and having an optical axis different from the observing axis of the imaging device, wherein the optical device shares the sample holder and the horizontal coarse transfer mechanism with the scanning probe microscope unit section, and wherein the imaging device is configured to observe a focal position of the objective lens of the optical device, the cantilever of the scanning probe microscope unit section and the sample at the same time.

(16) In sixteenth aspect, there is provided the scanning probe microscope according to the fifteenth aspect, wherein the focal position of the objective lens of the optical device and the position of the sample are adjusted by using the image displayed on the image display device.

(17) In a seventeenth aspect, there is provided the scanning probe microscope according to the fifteenth aspect, wherein the optical device has an illumination lamp that emits an illumination light along the optical axis, the illumination light emitted onto a surface of a sample of the optical device is observed by the imaging device, and the focal position of the objective lens of the optical device and the sample are positioned by using the spot of the illumination light as a mark.

(18) In an eighteenth aspect, there is provided the scanning probe microscope according to the first aspect, further including: a focus adjustment mechanism configured to drive the lens provided in the imaging device from an external.

(19) In a nineteenth aspect, there is provided the scanning probe microscope according to the first aspect, wherein a microphone configured to collect peripheral sound is arranged within the scanning probe microscope unit section, and the collected sound is output from a speaker.

(20) In a twentieth aspect, there is provided the scanning probe microscope according to the first aspect, wherein the imaging device includes a video camera that continuously picks up images or a still camera that continuously shoots images.

According to at least one of the above-described aspects, it is possible to obtain the following advantageous effects:

Since the imaging device wider in viewing field than the optical microscope is provided, the sample and the probe can be positioned with high precision as compared with visual confirmation.

Further, since the horizontal coarse transfer mechanism and the vertical coarse transfer mechanism are operated remotely through the image display device using the imaging device to position the portion to be measured, all of the operation can be performed in front of the image display device.

Further, even if the scanning probe microscope unit is arranged within the cover, the internal situation can be observed on the image display device by providing an illumination lamp in the imaging device, and after the sample has been set in the sample holder, all of the processes can be operated while watching the image display device in front of the image display device without opening the cover. The measurement can be efficiently and easily performed, and a positioning precision of the portion to be measured is improved compared to visual confirmation.

Further, since the illumination lamp can be turned on/off remotely, even if the illumination lamp acts as a noise source, the illumination lamp can be turned off by the remote operation. Also, when the illumination lamp is formed of an LED light source, a power consumption is smaller than that of a halogen illumination lamp, and heat generation is smaller, as a result of which an internal temperature rising is small even when the soundproof cover is closed, and a temperature drift during measuring operation can be suppressed. Further, the above illumination lamp can be turned off from the external the so that unnecessary illumination can be eliminated, and a rise in the temperature can be suppressed.

Further, when the illumination of the optical microscope and the imaging device is supplied from a common light source, the costs can be suppressed.

Further, with the arrangement of the microphone within the scanning probe microscope unit, a sound within the cover can be also confirmed, and realistic operation can be performed. If a failure or trouble is generated within the unit, an internal sound is picked up by the microphone such that the measurer can recognize the sound when the trouble is generated, and safety is also improved.

REFERENCE NUMERALS

1 scanning probe microscope
2 scanning probe microscope unit section
3 control device
4 soundproof cover
17 camera
22 Z-stage (vertical coarse transfer mechanism)

23 horizontal fine transfer mechanism
24 vertical fine transfer mechanism
28 cantilever
29 semiconductor laser
31 photodetector
33 displacement detection mechanism
34 XY-stage (horizontal coarse transfer mechanism)
38 sample holder
40 optical microscope
42 objective lens
43 focus adjustment mechanism
44 zoom tube
45 CMOS camera
47 illumination device
51 illumination lamp
54 LED light source
55 light guide
56 light guide fitting jig
60 white light interferometer
61 objective lens
62 piezoelectric actuator
63 housing

What is claimed is:

1. A scanning probe microscope comprising:
  a scanning probe microscope unit section including,
    a cantilever having a probe at a tip thereof,
    a cantilever holder configured to fix the cantilever,
    a sample holder on which a sample is configured to be placed,
    a horizontal fine transfer mechanism configured to relatively scan a surface of the sample with the probe,
    a vertical fine transfer mechanism configured to control a distance between the probe and the sample surface,
    a horizontal coarse transfer mechanism and a vertical coarse transfer mechanism which are larger in operation range than the horizontal fine transfer mechanism and the vertical fine transfer mechanism, and
    an optical microscope configured to observe the cantilever and the sample;
  a control device configured to control the scanning probe microscope;
  an imaging device having an observation axis non-coaxial with an optical axis of the optical microscope, and to which a viewing field, which is wider than that of the optical microscope and capable of observing the cantilever and the sample at the same time, can be set; and
  an image display device including a first image display configured to display an image observed by the optical microscope and a second image display configured to display an image observed by the imaging device.

2. The scanning probe microscope according to claim 1, further comprising:
  a cover configured to cover the scanning probe microscope unit section,
  wherein the imaging device is housed within the cover, and a state inside the cover can be observed by the imaging device when the cover is closed.

3. The scanning probe microscope according to claim 1, wherein an area which is ¼ or larger than an area of the sample holder can be observed by the viewing field of the imaging device.

4. The scanning probe microscope according to claim 1, further comprising:
  an illumination lamp including a first illumination lamp and a second illumination lamp, the first illumination lamp configured to illuminate the viewing field of the imaging device.

5. The scanning probe microscope according to claim 4, wherein the illumination lamp can be turned on and off by remote control.

6. The scanning probe microscope according to claim 4, wherein the illumination lamp includes a light source having an LED light emitting element arranged in the scanning probe microscope unit section or an arbitrary light source installed in a place distant from the scanning probe microscope unit section, from which a light is propagated to the scanning probe microscope unit section by a light guide.

7. The scanning probe microscope according to claim 4, wherein the second illumination lamp is configured to illuminate the viewing field of the optical microscope, and
  wherein light is supplied to the first illumination lamp and the second illumination lamp from a common light source.

8. The scanning probe microscope according to claim 1, wherein an angle of observation axis of the imaging device with respect to the sample surface is equal to or larger than 30° and equal to or smaller than 90°.

9. The scanning probe microscope according to claim 1, wherein the imaging device has a zoom function, and
  wherein the first image display is configured to display an image obtained by enlarging an area smaller than a maximum viewing field observable by the imaging device.

10. The scanning probe microscope according to claim 1, wherein at least one of the horizontal coarse transfer mechanism and the vertical coarse transfer mechanism has an actuator configured to be operated remotely, and
  wherein the at least one of the horizontal coarse transfer mechanism and the vertical coarse transfer mechanism is configured to be operated remotely while confirming an image displayed on the image display device.

11. The scanning probe microscope according to claim 1, wherein the scanning probe microscope unit section includes a plurality of scanning probe microscope measurement head sections each including the cantilever having the probe, the cantilever holder, the horizontal fine transfer mechanism, the vertical fine transfer mechanism, and a displacement detection mechanism,
  wherein the plurality of scanning probe microscope measurement head sections shares the sample holder and the horizontal coarse transfer mechanism with each other, and
  wherein the imaging device is configured to observe the cantilevers of the plurality of scanning probe microscope measurement head sections and the sample at the same time.

12. The scanning probe microscope according to claim 11, wherein a position between at least one of the plurality of probes provided in the scanning probe microscope unit section and the sample are adjusted by using the image displayed on the image display device.

13. The scanning probe microscope according to claim 11, wherein the optical microscope has an illumination lamp that emits an illumination light along the optical axis,
  wherein the illumination light emitted onto the surface of the sample of the optical microscope is observed by the imaging device, and at least one of the plurality of probes provided in the scanning probe microscope unit section and the sample are positioned by using a spot of the illumination light as a mark.

14. The scanning probe microscope according to claim 11, further comprising:
a displacement detection mechanism of an optical lever system configured to emit a laser beam onto a back surface of the cantilever and detect a reflected light from the cantilever by a detector,
wherein when a laser spot is positioned on a back surface of the cantilever, a leak light of the laser spot emitted onto the sample surface, which is spread out of the cantilever, is observed by the imaging device, and at least one of the plurality of probes provided in the scanning probe microscope unit section and the sample are positioned by using the leak light as a mark.

15. The scanning probe microscope according to claim 1, wherein the scanning probe microscope unit section includes an optical device having an objective lens having a viewing field narrower than a maximum viewing field of the imaging device and having an optical axis different from the observing axis of the imaging device,
wherein the optical device shares the sample holder and the horizontal coarse transfer mechanism with the scanning probe microscope unit section, and
wherein the imaging device is configured to observe a focal position of the objective lens of the optical device, the cantilever of the scanning probe microscope unit section and the sample at the same time.

16. The scanning probe microscope according to claim 15, wherein the focal position of the objective lens of the optical device and the position of the sample are adjusted by using the image displayed on the image display device.

17. The scanning probe microscope according to claim 15, wherein the optical device has an illumination lamp that emits an illumination light along the optical axis, the illumination light emitted onto a surface of a sample of the optical device is observed by the imaging device, and the focal position of the objective lens of the optical device and the sample are positioned by using a spot of the illumination light as a mark.

18. The scanning probe microscope according to claim 1, further comprising:
a focus adjustment mechanism configured to drive a lens provided in the imaging device from an external.

19. The scanning probe microscope according to claim 1, wherein a microphone configured to collect peripheral sound is arranged within the scanning probe microscope unit section, and the collected sound is output from a speaker.

20. The scanning probe microscope according to claim 1, wherein the imaging device includes a video camera that continuously picks up images or a still camera that continuously shoots images.

* * * * *